S. QWAM.
SNOW REMOVER.
APPLICATION FILED MAY 28, 1920.

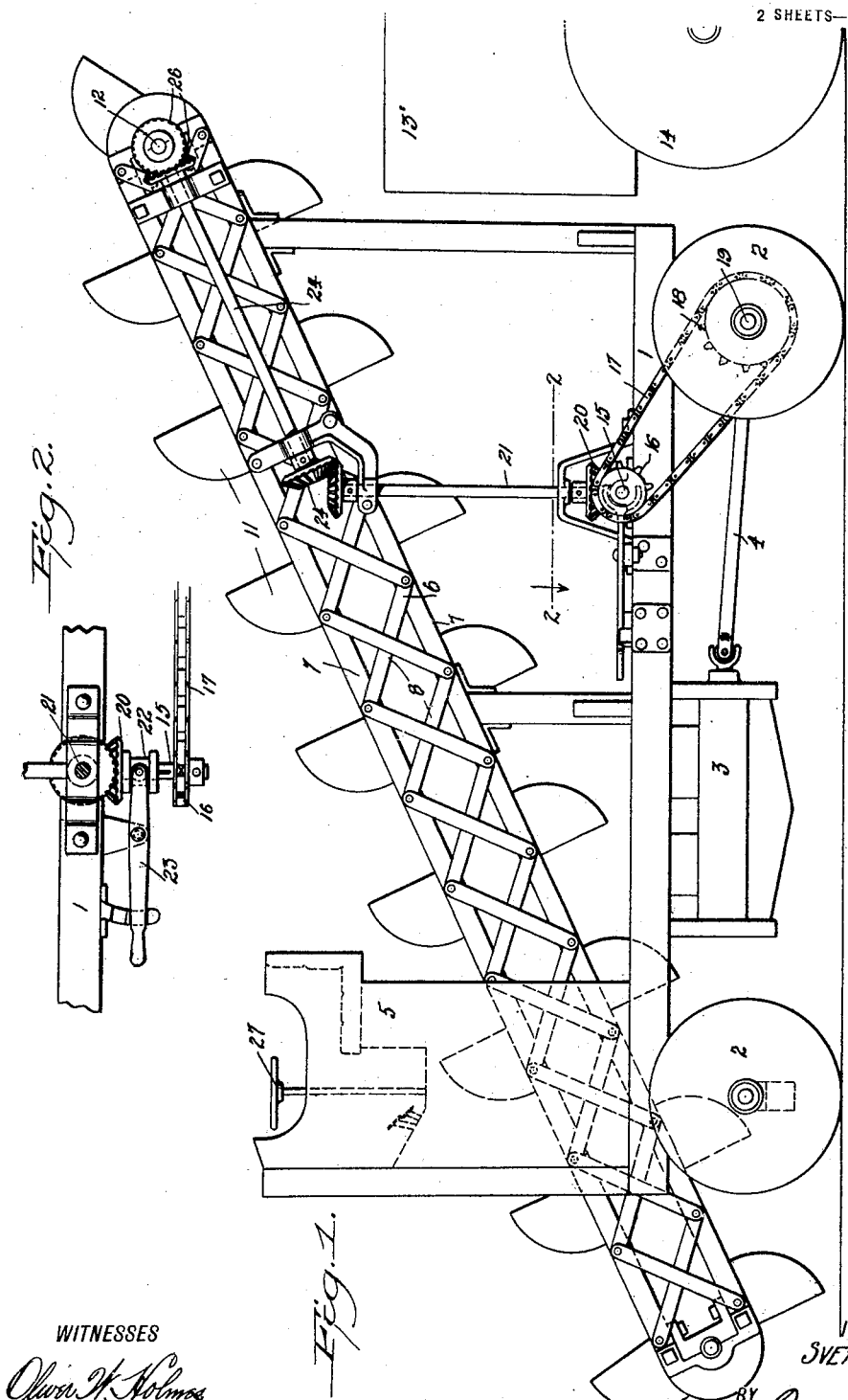

1,404,140.

Patented Jan. 17, 1922.

WITNESSES
Oliver W. Holmes
S.W. Foster

INVENTOR
SVERRE QWAM
BY Munn & Co.
ATTORNEYS

UNITED STATES PATENT OFFICE.

SVERRE QWAM, OF BROOKLYN, NEW YORK.

SNOW REMOVER.

1,404,140.   Specification of Letters Patent.   Patented Jan. 17, 1922.

Application filed May 28, 1920. Serial No. 384,957.

*To all whom it may concern:*

Be it known that I, SVERRE QWAM, a subject of the King of Norway, and a resident of the city of New York, borough of Brooklyn, in the county of Kings and State of New York, have invented a new and Improved Snow Remover, of which the following is a full, clear, and exact description.

This invention relates to improvements in snow removers an object of the invention being to provide a snow removing apparatus mounted upon a motor vehicle and operated by the engine of the motor vehicle to remove the snow and deposit it in a second vehicle for conveying the snow to a point of dump.

A further object is to provide a snow remover which will move along the ground and automatically pick up the snow and convey the same to a second vehicle and perform this operation quickly and thoroughly.

With these and other objects in view the invention consists in certain novel features of construction and combinations and arrangements of parts as will be more fully hereinafter described and pointed out in the claim.

In the accompanying drawings—

Figure 1 is a view in side elevation illustrating my invention.

Figure 2 is a fragmentary view in section on the line 2—2 of Figure 1.

Figure 3:
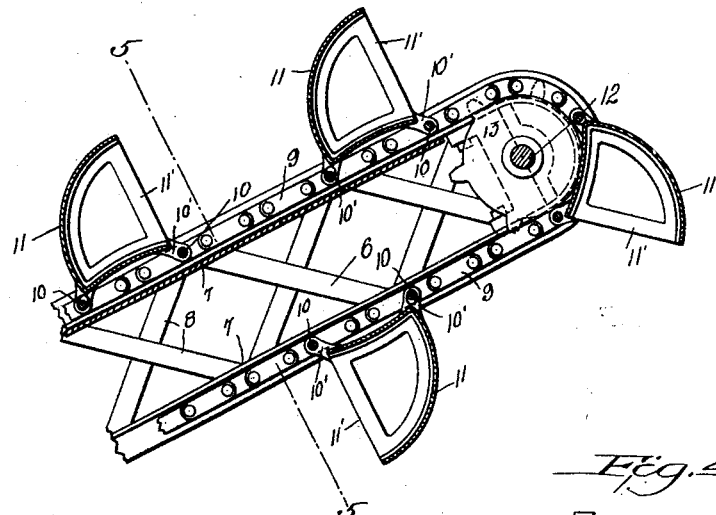
Figure 3 is a fragmentary view in longitudinal section through the central portion of the rear end of the conveyor at one end.
Figure 4:
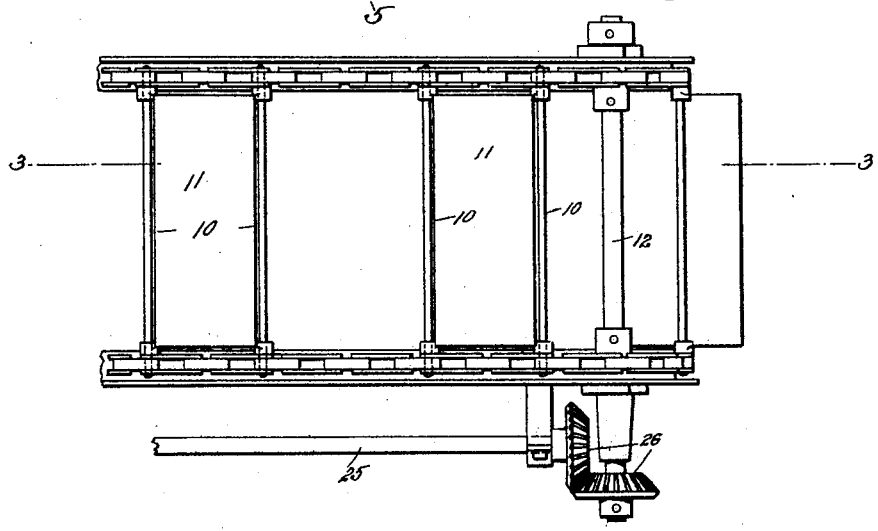
Figure 4 is a plan view of Figure 3.
Figure 5:
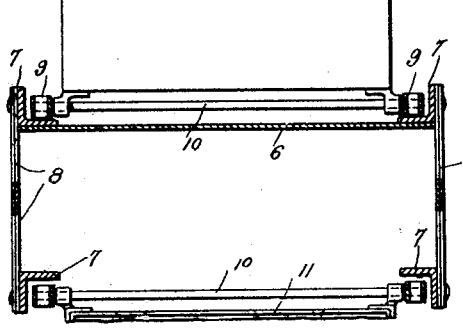
Figure 5 is a view in transverse section on the line 5—5 of Figure 3.

1 represents the body or frame of a motor vehicle truck supported on wheels 2 and provided with an engine 3 connected by a drive shaft 4 with the rear wheels 2 of the truck to drive the latter in any approved manner.

5 represents a seat supporting frame at the front end of the truck. The truck body 1 supports at an incline a skeleton work conveyor supporting frame 6 inclining upwardly from its forward to its rear end. This frame 6 is composed of corner angle bars 7 connected by a diagonal or other braces 8, the angle bars 7 constituting rails guiding the endless chains 9 of my improved conveyor. I preferably provide two of these chains and connect them by rods 10 on which scoop buckets 11 are pivotally mounted.

The buckets 11 are connected to two of these rods 10 and each bucket is provided with four perforated lugs 10' receiving the rods and holding the buckets in relatively rigid relation thereto. The scoop buckets 11 are strengthened by open partitions or braces 11' which conform in shape to the interior shape of the buckets and are fixed therein.

The ends of the frame 6 provide rotary mounting for shafts 12 on which sprocket wheels 13 are secured and over these sprocket wheels the endless chains 9 move. The buckets or scoops 11 move forwardly on the lower run of the conveyor and at the forward end of the frame 6 they operate to scoop up the snow or other material to be removed and convey this material up the upper run of the conveyor frame and at the rear end thereof dump the material into the body 13' of a vehicle 14 for conveying material to any desired dump.

A shaft 15 is mounted on the frame 1 and is provided with a sprocket wheel 16 connected by a chain 17 with a sprocket wheel 18 on the rear axle 19, on which the rear wheels 2 are secured, to transmit motion from the axle to the shaft 15.

The shaft 15 is connected by bevelled gears 20 with a vertical shaft 21 and the bevelled gear 20 on shaft 15 is controlled by means of a clutch 22 operated in any approved manner to connect or disconnect the snow removing conveyor with the operating means therefor, and while I have illustrated an ordinary hand lever 23 to operate this clutch, it is obvious that it may be controlled by the driver of the vehicle in any desired manner so that he can conveniently stop and start the conveyor at will.

The shaft 21 is connected by a pair of bevelled gears 24 with a shaft 25 supported on the frame 6 and connected by bevelled gears 26 with the shaft 12 so that the shaft 12 and the conveyor are positively driven when the gears 20 are in mesh.

The operation is as follows: As the truck moves over the ground, it will, through the medium of the driving mechanism just described, impart motion to the endless chains 9 to move the scoop buckets 11 and the latter will scoop up the snow or other material and convey it to the rear of the truck and drop it into the body of the second vehicle as indicated in Figure 1. The operator is located at the forward end of the truck and guides the latter through the medium of the ordinary steering wheel 27, and while I have not illustrated in detail the particular mechanism for controlling the operation of the truck, it is obvious that any approved means might be employed for this purpose.

Various slight changes might be made in the general form and arrangement of parts described without departing from the invention, and hence I do not limit myself to the precise details set forth, but consider myself at liberty to make such changes and alterations as fairly fall within the spirit and scope of the appended claim.

I claim:

In a snow remover, the combination with a motor vehicle, of a frame supported by the motor vehicle located at an incline, said frame at its lower end projecting beyond the front wheels of the motor vehicle and at its rear end projecting beyond the rear end of the motor vehicle, an endless conveyor on said frame having scoop buckets thereon, a shaft supported on the vehicle, means for transmitting motion from said shaft to the conveyor, a sprocket wheel on said shaft, a sprocket wheel on the driving axle of the vehicle, a chain connecting said sprocket wheels, and clutch means controlling the engagement of the sprocket wheel with the shaft.

SVERRE QWAM.